United States Patent
Maehara et al.

[11] Patent Number: 5,966,001
[45] Date of Patent: Oct. 12, 1999

[54] VOLTAGE REGULATING SYSTEM FOR VEHICLE INCLUDING ALTERNATOR

[75] Inventors: Fuyuki Maehara, Kariya; Hirohide Sato, Toyokawa, both of Japan

[73] Assignee: Denso Corporation, Kariya, Japan

[21] Appl. No.: 08/838,046

[22] Filed: Apr. 22, 1997

[30] Foreign Application Priority Data

Apr. 23, 1996 [JP] Japan ..................................... 8-101067
Feb. 3, 1997 [JP] Japan ..................................... 9-020503

[51] Int. Cl.⁶ ....................................................... H02H 7/06
[52] U.S. Cl. ................................................. 322/28; 322/18
[58] Field of Search ........................................ 322/28, 18

[56] References Cited

U.S. PATENT DOCUMENTS

| | | | |
|---|---|---|---|
| 4,220,908 | 9/1980 | Nicol | 322/28 |
| 4,563,631 | 1/1986 | Mashino et al. | 322/28 |
| 4,680,530 | 7/1987 | Mashino | 322/28 |
| 4,689,545 | 8/1987 | Komurasaki et al. | 322/28 |
| 4,945,299 | 7/1990 | Watanabe | 322/28 |
| 5,266,882 | 11/1993 | Morishita | 322/28 |
| 5,280,231 | 1/1994 | Kato et al. | 320/31 |
| 5,280,232 | 1/1994 | Kohl et al. | 322/28 |
| 5,323,101 | 6/1994 | Pierret | 322/28 |
| 5,467,008 | 11/1995 | Uchinami | 322/28 |
| 5,491,400 | 2/1996 | Iwatani et al. | 322/28 |
| 5,703,472 | 12/1997 | Aoyama et al. | 322/28 |
| 5,719,485 | 2/1998 | Asada | 322/28 |

FOREIGN PATENT DOCUMENTS

| | | |
|---|---|---|
| 0201243 | 12/1986 | European Pat. Off. . |
| 0487927A2 | 11/1990 | European Pat. Off. . |
| 0569284A1 | 11/1993 | European Pat. Off. . |
| 0691726A2 | 1/1996 | European Pat. Off. . |
| 4-275035 | 9/1992 | Japan . |
| 92/13380 | 8/1992 | WIPO . |

*Primary Examiner*—Nestor Ramirez
*Assistant Examiner*—Peter Medley
*Attorney, Agent, or Firm*—Pillsbury, Madison & Sutro LLP

[57] ABSTRACT

Battery voltage is compared by a comparator so that when the voltage of a normally-charged battery becomes higher than a normal reference voltage, it is regulated to be as high as a normal reference voltage. When an average value of the battery voltages in a period encompassing a typical operating speed of the engine becomes higher than an upper level, the reference voltage is lowered. On the other hand, when the average of the battery voltages in such period becomes lower than a lower level, the reference voltage is increased.

22 Claims, 12 Drawing Sheets

# 5,966,001

VOLTAGE REGULATING SYSTEM FOR VEHICLE INCLUDING ALTERNATOR

BACKGROUND OF THE INVENTION

1. Field of the Invention

The present invention relates to a voltage regulating system for a vehicle alternator, particularly, a regulating system for providing powerful battery charging without causing the battery to be overcharged.

2. Description of the Related Art

JPA 4-275035 discloses a regulating system for a vehicle alternator, in which when the battery voltage becomes lower than a lower limit, a regulator reference voltage is set to a higher level to provide a powerful battery charging, and when the battery voltage becomes higher limit, the regulator reference voltage is returned to a normal level to provide a moderate battery charging. This publication also proposes a voltage regulation based on an average of the battery voltage in order to remove harmonic waves (i.e., ripple) of higher than 750 Hz contained in the current rectified by a full-wave rectifier of the alternator so that it can be compared with the reference voltage accurately.

In general, the battery voltage changes with charging condition of the battery such as an accumulated amount of charging or discharging current of the battery, and the battery charging current (i.e. the output current of the alternator) also changes as the engine rotating speed changes.

In the town driving where the engine speed changes repeatedly between idling speed and cruising speed, the engine speeds and the charging current (or the battery voltage) are generally low. Therefore, if the reference voltage is lowered every time in response to a temporary increase of the battery voltage, the battery is apt to be short of charging. However, if the normal reference voltage is set to be high to solve the above problem, the battery is apt to be over-charged when a vehicle runs at a high speed on a high way for a long time, thereby decomposing the battery electrolyte in a short time and deteriorating the battery In the conventional voltage regulating system, the reference voltage is changed from one to another only according to the battery voltage irrespective of the vehicle running condition or conditions of the alternator. Therefore, the overcharging of battery can not be prevented sufficiently. Moreover, frequent change of the reference voltage causes frequent change of the engine load, which is not good for the engine control.

SUMMARY OF THE INVENTION

The present invention has an object of maintaining good battery condition by detecting accumulated amount of values related to the battery charging ability in a suitable detecting period so as to change the reference voltage of the voltage regulating unit in a controlled rate.

In general, the engine speed change of a vehicle in a town driving because of traffic signal or on-off operation of the motor-driven radiator fan is repeated between some tens of seconds and 30 minutes, and the suitable detecting period (e.g. a period between 3 and 30 minutes) prevents frequent fluctuation of the reference voltage.

The present invention has another object of maintaining the battery voltage as high as possible within a level not to cause overcharging of the battery.

In the voltage regulating system for a vehicle alternator according to the present invention, the output voltage of the alternator is regulated by a voltage regulator unit which provides a changeable reference voltage. The field current is controlled according to a comparison of the battery voltage with the changeable reference voltage. The reference voltage is changed according to an accumulated amount of values indicating battery charging ability such as battery voltage or battery-charging current sampled in the suitable detecting period.

As a result, the reference voltage is not changed very frequently, so that the alternator-driving torque does not change frequently. It is noted that frequent change in the battery voltage may be detrimental to vehicle electric loads.

The detecting period is preferably longer than a minimum operation period of a motor-driven radiator fan, so that the battery voltage fluctuation due to intermittent operation of the radiator fan is prevented.

According to the present invention, the reference voltage is lowered when the accumulated amount of values related to the battery charging ability becomes higher than a first level, and is raised when it becomes lower than a second level which is lower than the first level to stabilize the battery voltage.

According to a preferred embodiment of the present invention, when the accumulated amount of values related to the battery charging ability becomes lower than a third reference level which indicates battery over-discharging, the reference voltage is raised at a steep rate. Thus, the battery can be charged in a short time so that the battery does not become short of charging.

According to a preferred embodiment of the present invention, if the over-discharging of the battery continues for a long time, the reference voltage is not lowered. Accordingly, if the battery is over-discharged, even if the accumulated amount indicates battery over-charging temporarily, the powerful charging is maintained.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

Figure 1:
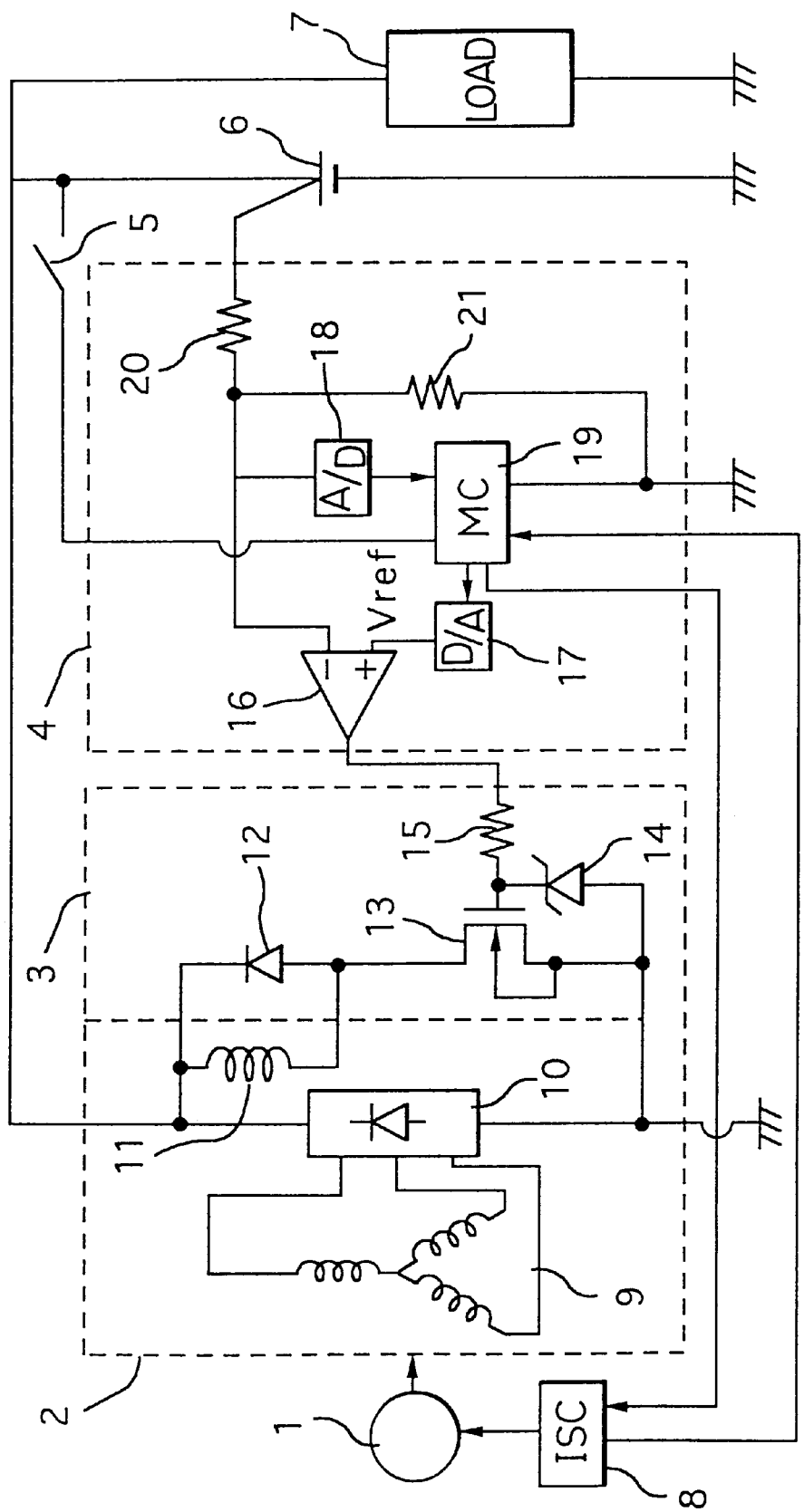
FIG. 1 is a block diagram of a battery charging system for vehicle having a voltage regulator of an alternator according to the present invention.

DETAILED DESCRIPTION OF THE PREFERRED EMBODIMENTS (First Embodiment)

A voltage regulating system according to a first embodiment of the present invention is described with reference to FIG. 1.

A vehicle alternator 2 driven by a vehicle engine 1 has a stator coil 9, a three-phase full-wave rectifier unit 10 and a field coil 11. The stator coil 9 generates AC voltage when field current flows in the field coil 11, and the AC voltage is rectified by the rectifying unit 10 and supplied to a battery 6 and an electric load 7.

A reference numeral 3 indicates a field current driving circuit, which is composed of a flywheel diode 12, a N-channel MOS transistor 13 for driving the field current, a gate protecting diode 14 of the MOS transistor, and a resistor 15 for suppressing surge voltages. The transistor 13 is turned on or off when control voltage is applied to the transistor 13 through the resistor 15 so that the field current supplied to the field coil 11 is controlled to regulate the alternator output voltage, and the current charged to the battery 6 can be controlled. The above battery charging system is well-known in the art, and the description is therefore omitted.

A battery charge control circuit 4 has resistors 20 and 21 which compose a voltage dividing circuit for dividing terminal voltage of the battery 6, and the a divided voltage of the battery (hereinafter referred to the battery voltage) provided by a junction point of the resistors 20 and 21 is applied to one of input terminals of a comparator 16 and to a microcomputer 19 through an A–D converter 18. Output signals of the microcomputer 19 are applied to a plus terminal of the comparator 16 as a reference voltage through the A–D converter 16. The comparator 16 compares the battery voltage with a reference voltage Vref. When the battery voltage is higher than the reference voltage, the comparator 16 provides a low level signal to turn off the transistor 13. On the other hand, if the battery voltage is lower than the reference voltage Vref, it provides a high level voltage to turn on the transistor 13, thus controlling the field current.

An output signal of the microcomputer 19 is sent to an idle speed control unit 8 which is a part of engine controlling microcomputer. The idle speed control unit 8 controls engine idle speed according to the input signal. A reference numeral 5 is a key switch, which energizes the microcomputer 19 when turned on.

Change-over of the reference voltages carried by the microcomputer 19 is described with reference to flow charts shown in FIGS. 2 and 3 next.

In a first step 100, when the key switch is turned on and an electric source voltage is applied to the microcomputer 19, the following initial setting operations are carried out:

(1) the reference voltage and the idle speed are set to initial values;

(2) a charging mode flag (described later) is set to a normal mode; and (3) a timer which counts a setting time (control executing period) is reset.

Figure 2:
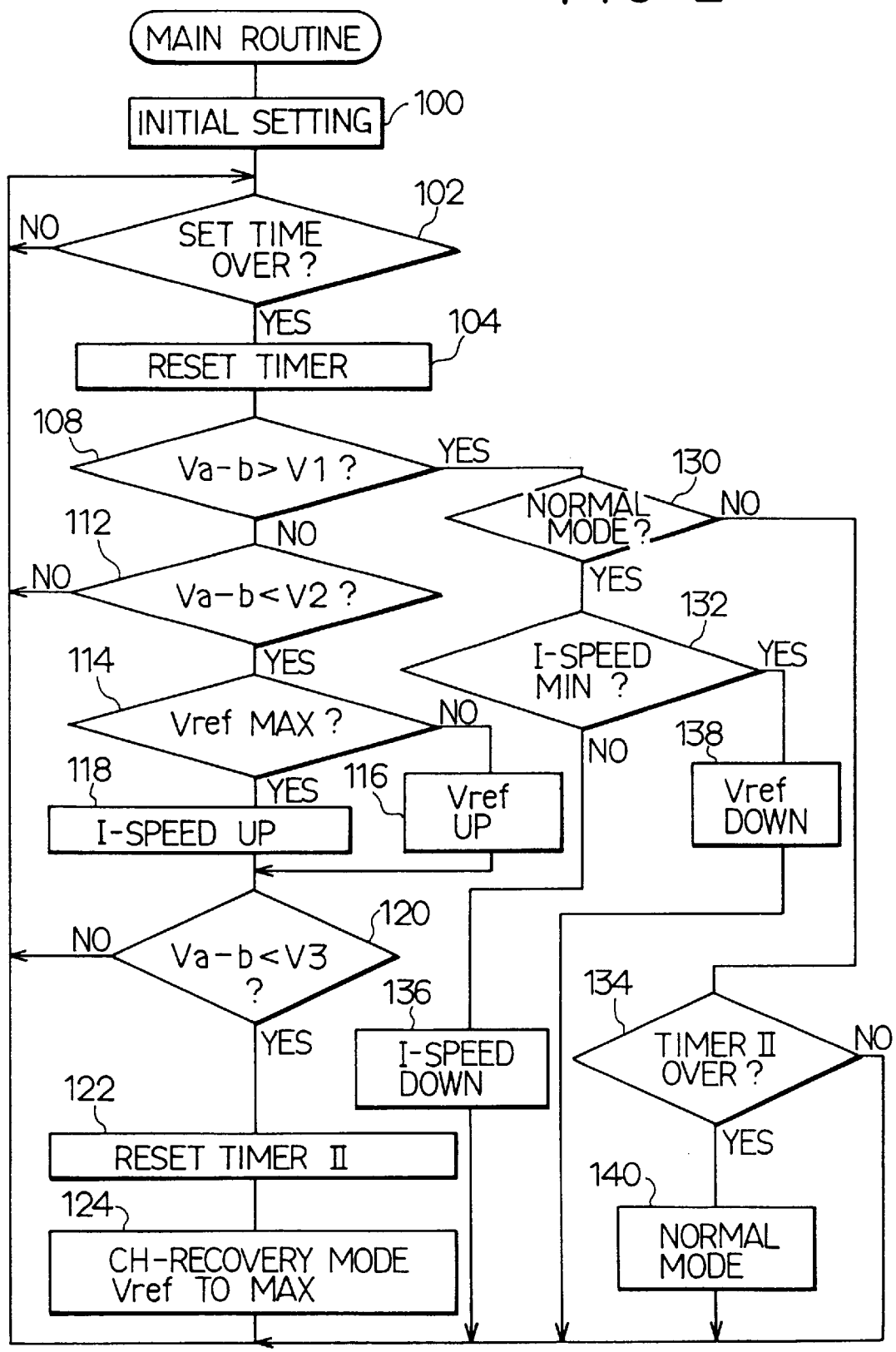
FIG. 2 is a flow chart showing a control operation of a microcomputer 19 shown in FIG. 1 according to a first embodiment of the present invention.
Figure 3:
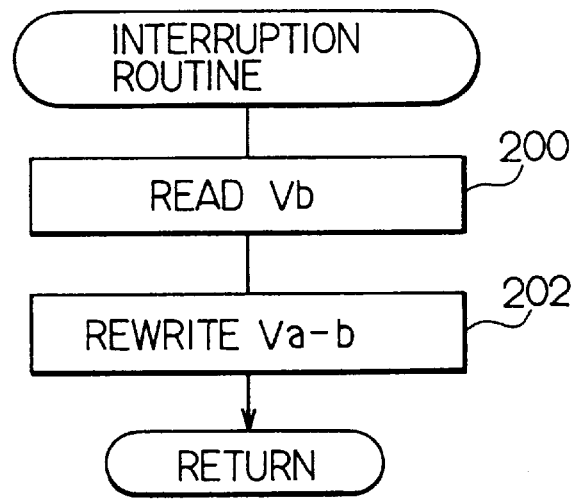
FIG. 3 is a flow chart showing another control operation of the microcomputer 19 according to the first embodiment of the present invention.

FIG. 3 shows an interruption subroutine which interrupts a main routine shown in FIG. 2, which is composed of steps of: reading battery voltage Vb (step 200); calculating an average Va–b of battery voltages including the last battery voltage Vb sampled in a period of 3–30 minutes and rewriting the previous memory of the average battery voltage Va–b (step 202); and returning to the main routine.

A step 102 decides the setting time of the main routine, which waits until a built-in timer is reset to start again (step 104) when it counts up the setting time.

Subsequently, whether or not the average Va–b of the battery voltage is higher than a reference level V1 indicating battery-over-charging is checked (step 108). If YES, the battery is deemed to be over-charged, and the step moves to a step 130. If NO, the step moves to a step 112, where whether or not the average Va–b is smaller than a reference level V2 indicating shortage of battery-charging is checked. If YES, the battery is deemed to be short of charging, and the step moves to a step 114. If NO, the step returns to the step 102.

In a step 114, whether or not the reference voltage Vref is a preset maximum level (i.e. 14 V) is checked. If NO, the reference voltage Vref is increased by a certain value (e.g. 0.5 V) as far as it remains lower than 14 V (step 116). If YES, the idle speed is set to a certain higher level, or a certain value (e.g. 50 rpm) is added to the idle speed as far as the idle speed remains lower than a maximum speed (step 118).

Thereafter, whether or not all the last three averages Va–b read in the step 108 are smaller than a reference level V3 indicating over-discharging battery is checked (step 120). If NO, the step returns to the step 102. And if YES, the battery 6 is deemed to be short of charging, a second timer is reset to start (122), and the step moves to a step 124.

In the step 124, the charging mode flag is set to a charge-recovery mode for powerful battery-charging, the reference voltage Vref is set to an upper level Vrefu and the step returns to the step 102. In this embodiment, V1 is 13.5V, V2 is 13.0 V and V3 is 12.5 V.

If the average Va–b is found higher than the level V1 in the step 108, in other words, if the battery-over-charging is found, the following steps are carried out.

In a step 130, whether the charging mode flag is the normal mode or the charge-recovery mode is checked. If it is the normal mode, the step moves to a step 132, and if it is the charge-recovery mode, the step moves to a step 134. The charge-recovery mode is a powerful-battery-charge-mode for the battery to recover the battery voltage in a short time.

In a step 132, whether or not the idle speed detected by the idle speed control unit 8 is as low as a minimum value is checked. If NO, the idle speed is reduced to a lower speed, or a certain value is reduced therefrom as far as the idle speed is higher than the minimum value (step 136). If the idle speed is as low as the minimum value, the reference voltage Vref is reduced by a fixed value as far as it is higher than a lower limit value Vrefd (i.e. 13.2 V) in a step 138, and the step returns to the step 102.

If the charging mode flag indicates the charge-recovery mode in the step 132, whether or not the executing time of the battery-recovery mode decided by the second timer is over is checked (step 134). If NO, the step returns to the step 102, and if YES, the charging mode flag returns to the normal mode in a step 140. And the step returns to the step 102.

If the battery-over-charging is found when the idle speed is the initial speed, the idle speed can be made lower than the initial speed in advance of lowering the reference voltage to improve fuel economy.

(Second embodiment)

A second embodiment is described with reference to flow charts shown in FIGS. 4 and 5.

Figure 5:
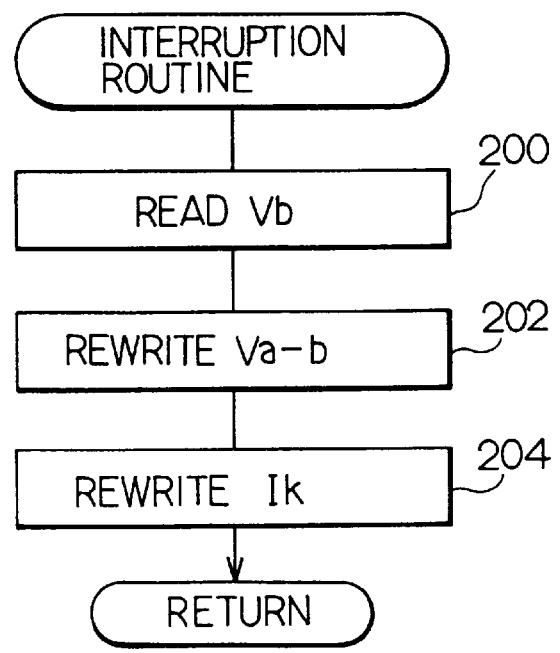
FIG. 5 is a flow chart showing a control operation of the microcomputer 19 according to the second embodiment.
Figure 4:
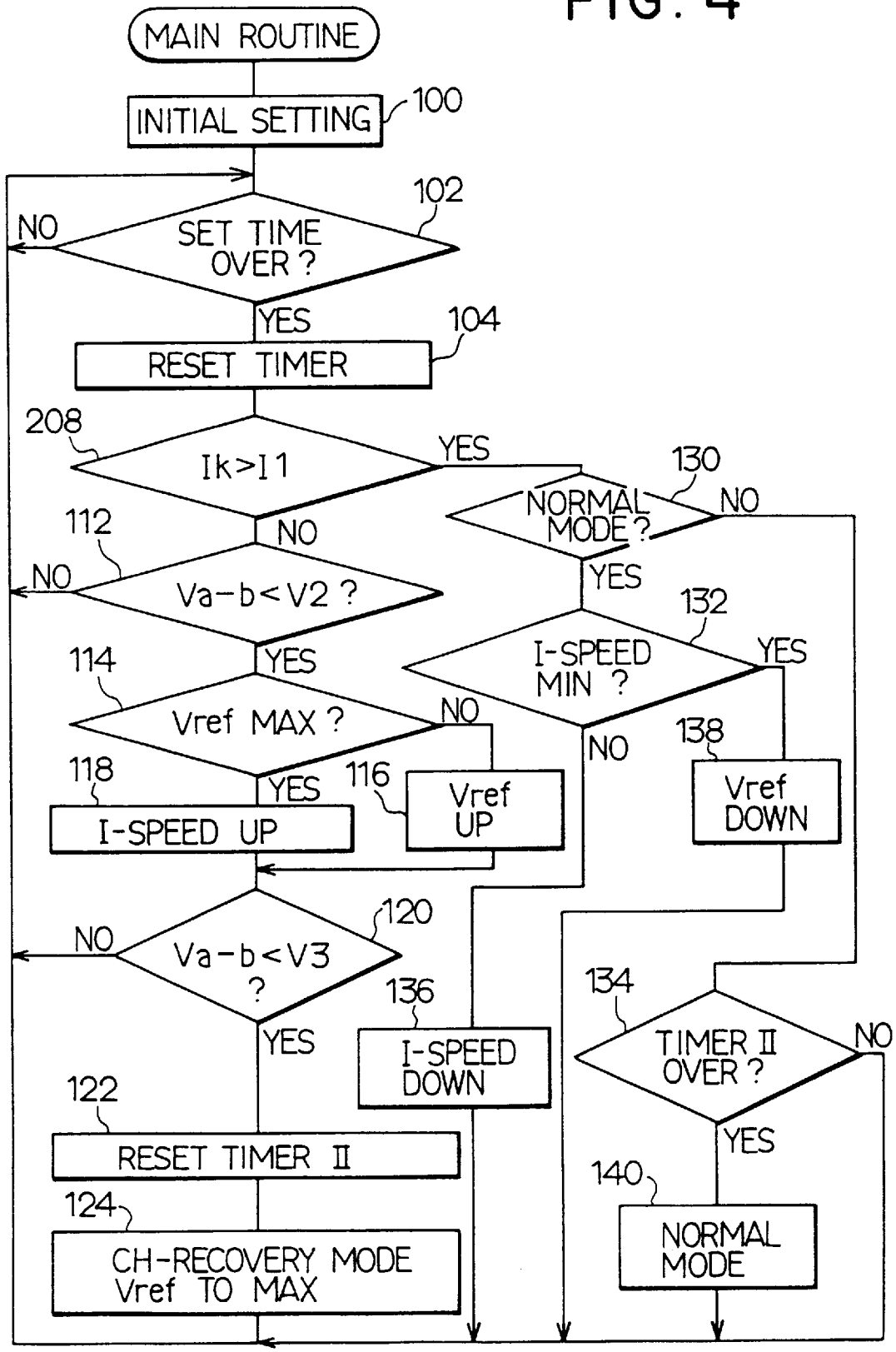
FIG. 4 is a flow chart showing a control operation of the microcomputer 19 according to the second embodiment.

This control routine has a step 204 as shown in FIG. 5 in addition to the control routine shown in FIG. 3 and a step 208 shown in FIG. 4 in place of the step 108 shown in FIG. 2.

In the step 204, all the battery voltages inclusive of the battery voltage Vb which is read this time sampled in the last period between 3 and 30 minutes are stored in a built-in map, and each battery-over-charging current corresponding to each of the respective battery voltages is searched from the built-in map and accumulated to have an accumulated-over-charging-current-value Ik, which renews the content of a memory.

In the step 208 shown in FIG. 4, whether or not the accumulated-over-charging-current-value Ik is larger than a reference value I1 indicating battery-over-charging is checked. If YES, the battery is deemed to be over-charged (significantly over-charged), and the step moves to the step 130. If NO, the step moves to the step 112, where whether or not the average Va–b is smaller than the reference level V2 indicating shortage of battery-charging is checked. Thus, the battery over-charging can be checked precisely.

(Third Embodiment)

A third embodiment is described with reference to flow charts shown in FIGS. 6 and 7.

Figure 6:
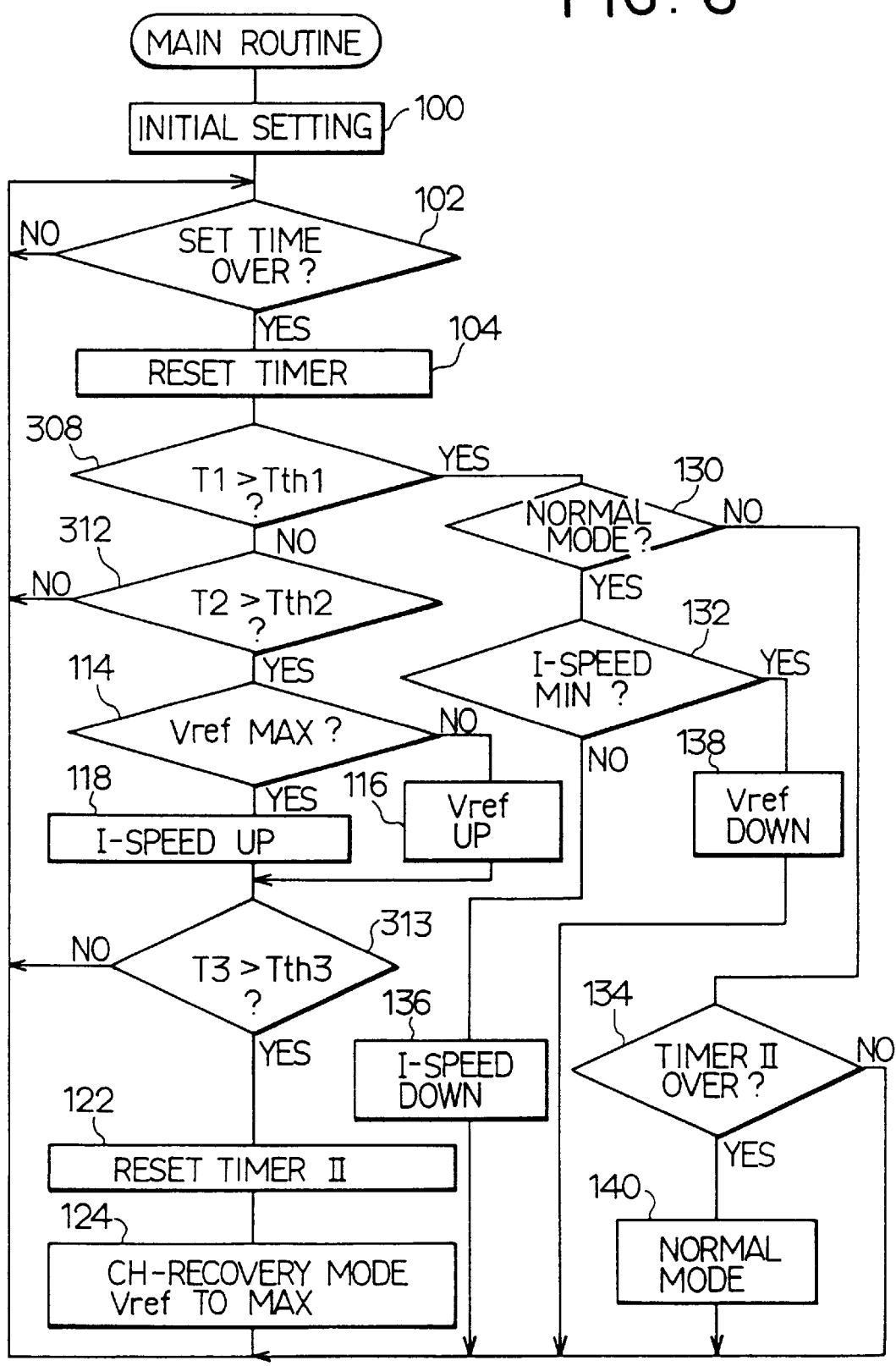
FIG. 6 is a flow chart showing a control operation of the microcomputer 19 according to a third embodiment of the present invention.
Figure 7:
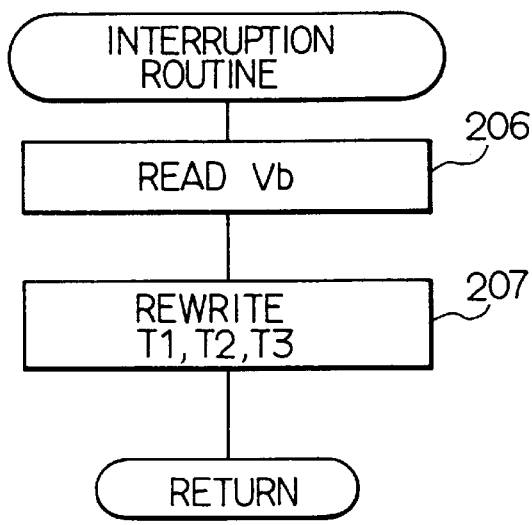
FIG. 7 is a flow chart showing a control operation of the microcomputer 19 according to the third embodiment.

The step 200 of the control routine shown in FIG. 2 is replaced with a step 206, and a step 207 is added thereto as shown in FIG. 7. The steps 108, 112 and 120 of the same are replaced with steps 308, 312 and 313 respectively as shown in FIG. 6.

In the step 206, the battery voltage Vb is compared with the reference level V1 indicating battery-over-charging, the reference level V2 indicating shortage of battery charging and the reference level V3 indicating battery over-discharging. In the step 207, a period T1 during which the battery voltage Vb is higher than the reference level V1, a period T2 during which the battery voltage is lower than the reference level V2 and a period T3 during which the battery voltage Vb is lower than the reference level V3 are measured respectively. Step 313 in FIG. 6 determines whether the period T3 is longer than a threshold period tth3. If YES, the battery is deemed to be over-discharged.

In the step 308, whether or not the over-charging period T1 is longer than an overcharging threshold level Tth1 is checked. If YES, the battery is deemed to be over-charged (significantly over-charged), and the step moves to the step 130. If NO, the step moves to the step 312.

In the step 312, whether or not the charging-current shortage period T2 is longer than a current shortage reference level Tth2 is checked. If YES, the battery is deemed to be short of charging, and the step moves to the step 114. And if NO, the step returns to the step 102.

Thus, it is not necessary to read the battery voltage directly so that the battery voltage can be solely compared with the reference levels V1, V2 and V3, thereby eliminating the A/D converter and others from the first embodiment to make the circuit structure more simple.

Figure 8:
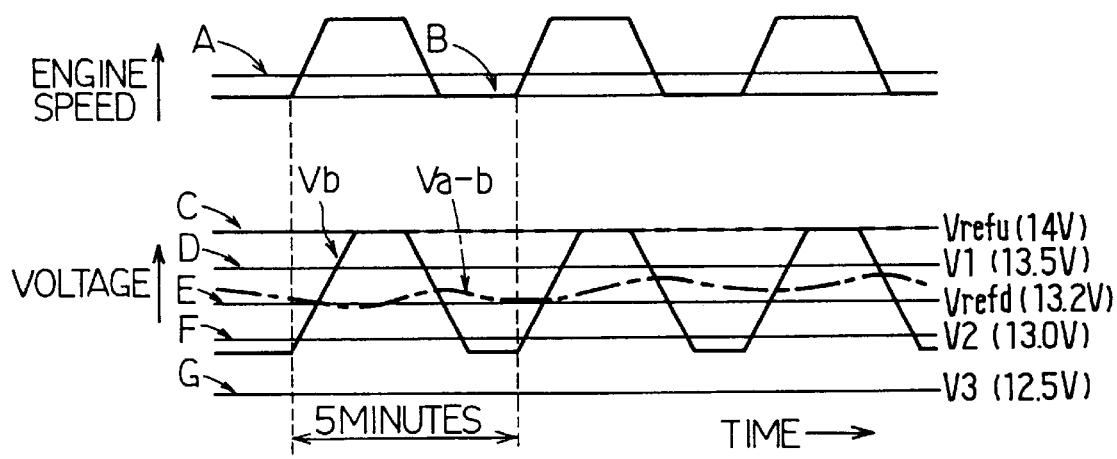
FIG. 8 is a timing chart of battery voltage, the average thereof and reference voltage in a town driving mode where the engine speed increases from the idle speed up to a fixed high speed every 5-minute.
Figure 9:
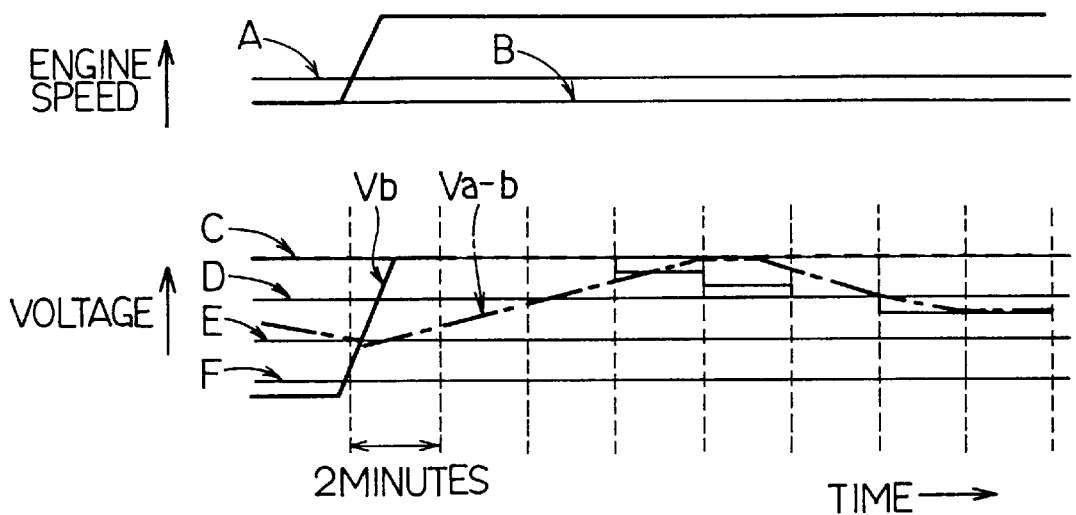
FIG. 9 is a timing chart of the battery voltage, the average thereof and the reference voltage in a outside-town driving in a mode where the engine speed increases to a high level and stays in a long period.
Figure 10:
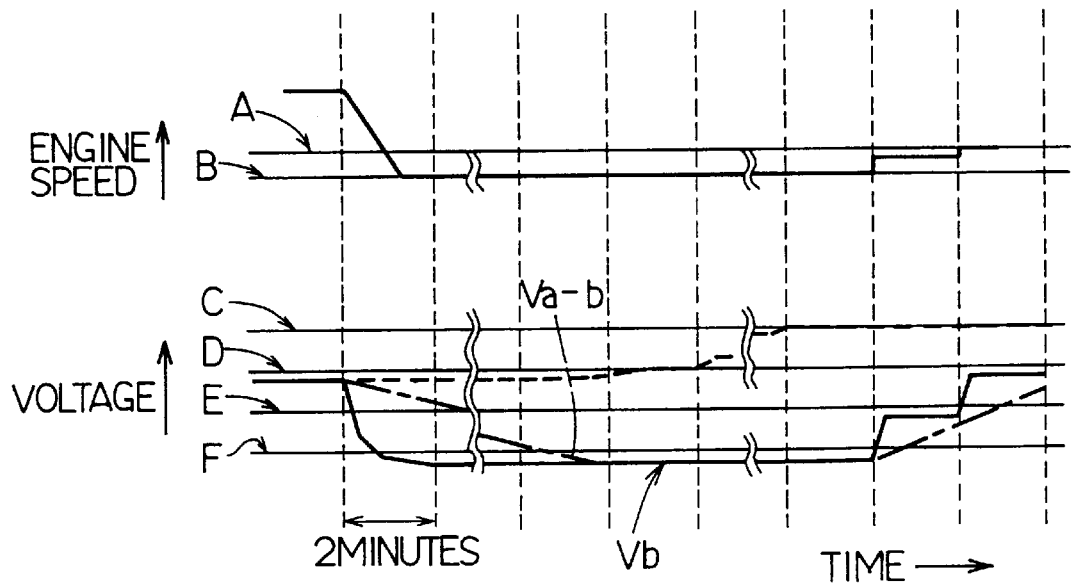
FIG. 10 is a timing chart of the battery voltage, the average thereof and the reference voltage in a mode where the idle speed continues for a long period.

FIGS. 8–10 show relationship between the battery voltage and the engine speed when the first embodiment is adopted.

FIG. 8 is a timing chart of the battery voltage Vb, the average value Va–b thereof and reference voltage in a town driving mode where the engine speed changes from the idle speed to a high speed in a 5-minute period. Here, lines A and B respectively indicate maximum and minimum values of the idle speed. FIG. 9 is a timing chart of the battery voltage Vb, the average Va–b thereof and the respective reference voltages in an outside-town driving mode where the engine speed is increased and maintained in a high speed range for a long time. FIG. 10 is a timing chart of the battery voltage Vb, the average Va–b thereof and the respective reference voltages in the idling mode for a long time.

As described above, the average Va–b of battery voltage Vb in a long period is detected to prevent the battery overcharging and stabilize the battery voltage at a suitable level. As a result the battery charging performance can be improved without causing the battery over-charge even when the battery voltage changes frequently.

The average Va–b of the battery voltage Vb can be obtained as a moving average or a delayed value instead of the simple average of the battery voltage.

(Fourth Embodiment)

A fourth embodiment is described with reference to FIGS. 11–15. The same part or structure is indicated by the same reference numeral.

The fourth embodiment is different from the first embodiment shown in FIG. 1 in that the battery charge control circuit 4 has neither A/D converter nor microcomputer. In this embodiment, the field current driving circuit 3 and the charge control circuit 4 are put in the alternator 2.

The charge control circuit 4 is composed of resistors 20 and 21, comparators 23–25 and 30, an over-charging time accumulating circuit 26, a reference voltage setting circuit 27, a charge-shortage time accumulating circuit 28, and a reference-voltage generating circuit 29.

Figure 14:
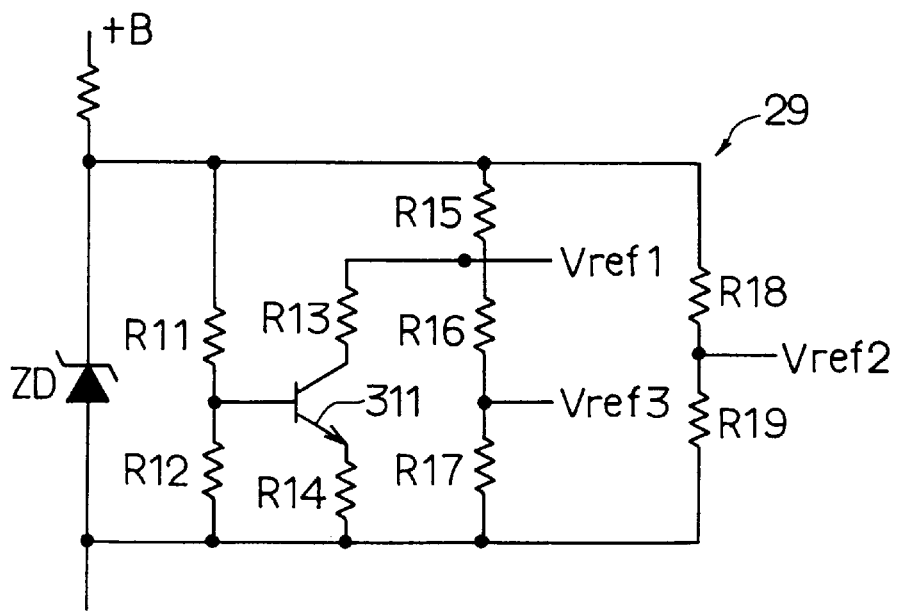
FIG. 14 is a circuit diagram of a block circuit 29 shown in FIG. 11.

The reference-voltage generating circuit 29 provides reference level voltages Vref1, Vref2 and Vref3. FIG. 14 shows an example of the reference-voltage generating circuit 29. However, the description of the circuit 29 is omitted because it is well known.

A comparator 23 compares a voltage divided by a voltage dividing circuit composed of resistors 20 and 21 with the reference level voltage Vref1 (e.g. 13. 7 V) and determine whether or not the battery is over-charged. When a division of the battery voltage (hereinafter referred to the battery voltage) becomes higher than the reference level Vref1, the comparator 23 provides a low-level voltage. Every period during which the low-level voltage is supplied is accumulated by the over-charging time accumulating circuit 26 to provide the over-charging period T1. The over-charging time accumulating circuit 26 examines whether or not the over-charging period T1 is longer than the over-charging reference level Tth1 (e.g. 30 minutes or 50% occupancy). If the over-charging time accumulating circuit 26 finds T1>Tth1 which may cause abnormal reduction in the battery electrolyte, the reference-voltage setting circuit 27 changes the reference voltage Vref to a lower voltage. That is, the reference voltage Vref1 is lowered by 0.2 V. The reference voltage Vref changed by the reference-voltage setting circuit 27 is sent to the comparator 30, which compares the battery voltage with the reference voltage Vref to drive the transistor 13 and regulate the battery voltage at the reference voltage Vref. To the contrary, if the over-charging time accumulating circuit 26 finds T1>Tth1 (which indicates that the battery over-charging is dissolved), a command signal is sent to the reference-voltage setting circuit 27 to change the reference voltage Vref to the higher value, and the reference-voltage setting circuit 27 increases the reference voltage Vref by 0.2 V. The reference-voltage setting circuit has a histeretic function to differentiate timing of lowering the over-charging reference level Tth1 from timing of restoring the same, thereby preventing the hunting.

Figure 12:
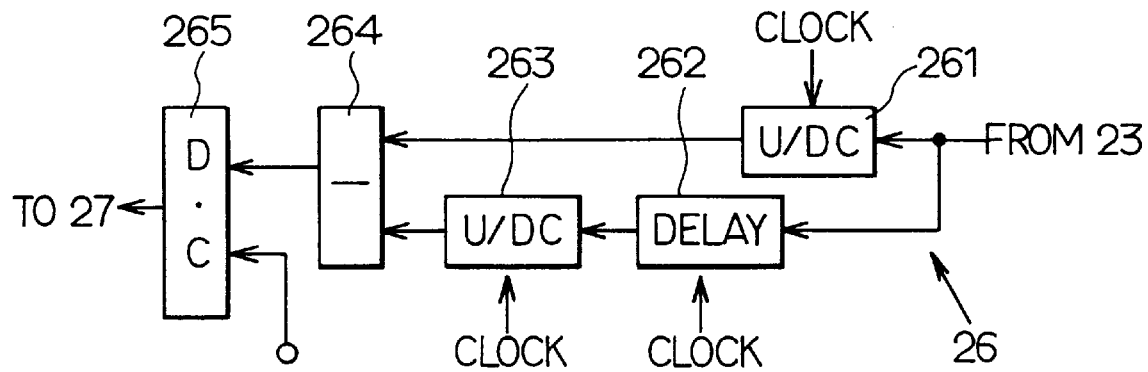
FIG. 12 is a circuit diagram of a block circuit 26 shown in FIG. 11.

FIG. 12 is a block diagram of the over-charging time accumulating circuit 26. The output signal of the comparator 23 is sent to a UP/DOWN counter 261, which counts up every 0.1 second if the battery voltage is higher than the reference voltage Vref1 and counts down if lower than the same. The output signal of the comparator 23 is delayed by a digital delay circuit 262 about 26 minutes and is sent to an UP/DOWN counter 263, which counts up every 0.1 second if the delayed battery voltage is higher than the reference level Vref1 and counts down if lower than the same.

A reference numeral 264 is a subtracter, which subtracts the output signal of the UP/DOWN counter 263 from the output signal of the UP/DOWN counter 261 and sent the resultant signal to a digital comparator 265. The resultant value is given by subtracting the output signals of the comparator 23 accumulated when the switch is turned on until 26 minutes before from the output signals of the comparator 23 accumulated when the switch is turned on until now. That is the output signals of the comparator 23 accumulated during the last 26 minutes.

The digital comparator 265 compares the above subtracted value with a preset digital number (e.g. 0). If the subtracted value is larger than the preset digital number, it is indicated that more than 50% of the 26-minute-period is total period of the battery voltage higher than the reference level Vref1. And the reference-voltage setting circuit 27 is to lower the reference voltage.

Figure 13:
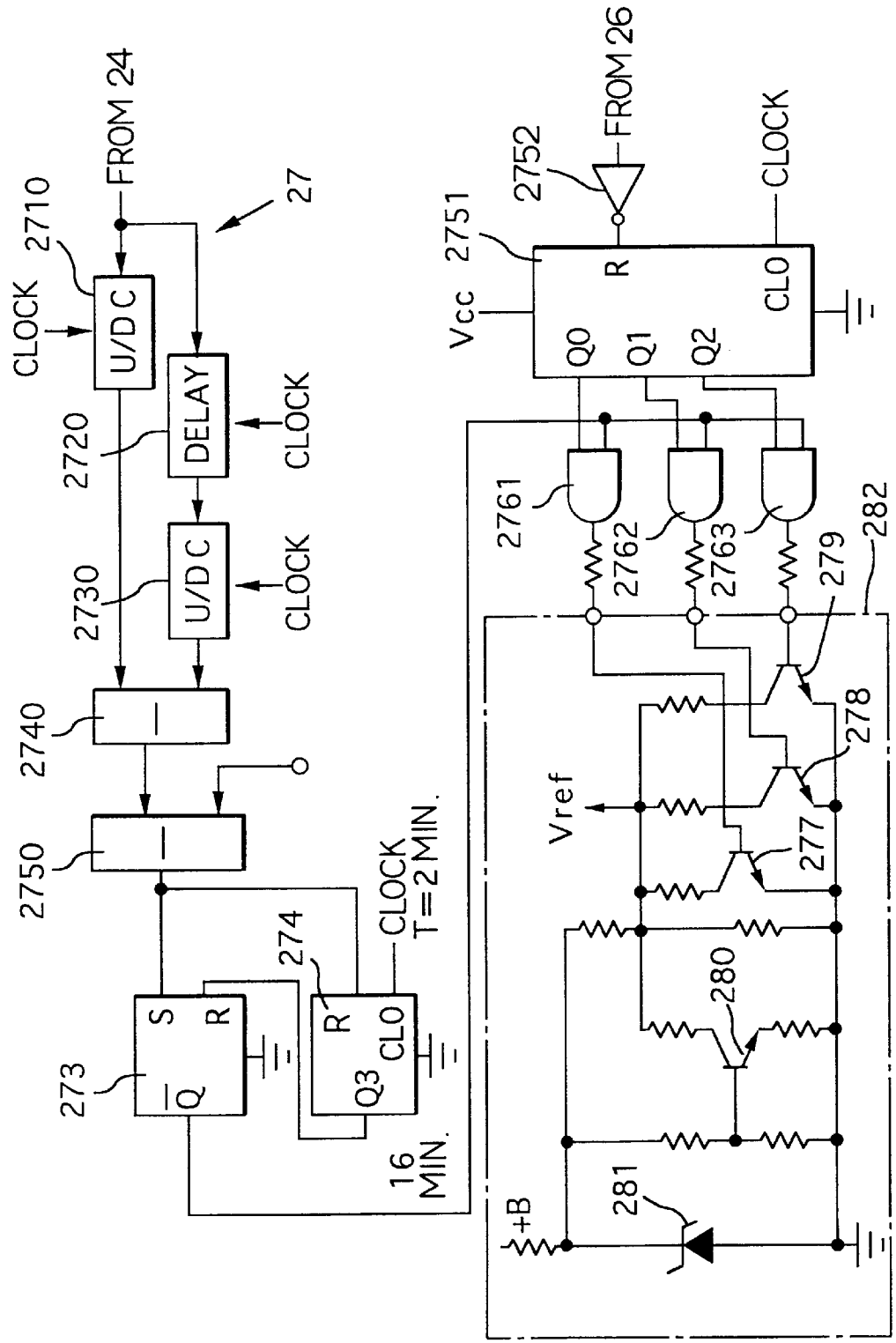
FIG. 13 is a circuit diagram of a block circuit 27 shown in FIG. 11.

FIG. 13 shows a circuit diagram of the reference-voltage setting circuit 27.

The comparator 24 compares a division of the battery voltage divided by the dividing circuit composed of the resistors 20 and 21 with the over-discharging level reference voltage Vref3 (e.g. corresponding to 12. 5 V for the battery). If the division of the battery voltage (hereinafter referred to as the battery voltage) becomes lower than the reference voltage Vref3, the comparator 24 sends a high level voltage to a UP/DOWN counter 2710, which counts up every 0.1 second if the battery voltage is lower than the reference voltage Vref3 and counts down every 0.1 second if higher than the reference level voltage Vref3. The output signal of the comparator 24 is delayed 26 minutes by a digital delay circuit 2720 and sent to an UP/DOWN counter 2730, which counts up every 0.1 second 26 minutes later if the battery voltage is lower than the reference level voltage Vref3 and counts down if higher after 26 minutes later.

A reference numeral 2740 is a subtracter to subtract the counted signal of the UP/DOWN counter 2730 from the counted signal of the UP/DOWN counter 2710, which is sent to a digital comparator 2750. The result of this subtraction is equal to a value which is given by subtracting the output signals of the comparator 24 accumulated after it is powered until 26 minutes before from the output signals of the comparator 24 accumulated after it is powered until the present, that is, the output signals of the comparator 24 accumulated in the last 26 minutes.

The digital comparator 2750 compares the above result of substraction with a preset digital value (i.e. 0 in this embodiment). If the result is larger than the preset value, it is indicated that the total period in which the battery voltage is lower than the reference voltage Vref3 is more than 50% of the 26-minute period, and the battery is deemed to be over-discharged. Consequently, an RS flip-flop circuit 273 is set to close AND gates 2761, 2762 and 2763. In other words, when the battery is deemed to be over-discharged, the AND gates 2761, 2762 and 2763 prevent the reference voltage Vref from lowering.

A reference numeral 274 is a 4-bit counter, which starts when the digital comparator 2750 provides a high level signal and counts a clock pulse every 2 minutes to reset the flip-flop circuit 273 when it measures 16 minutes. That is, when the AND gates 2761, 2762 and 2763 are closed, the powerful battery charging is carried out for 16 minutes without lowering the reference voltage.

When the battery is not over-discharged, the flip-flop circuit 273 provides a high level signal.

A reference numeral 2751 is a 3-bit counter, which is reset via an inverter 2752 when an output signal of the digital comparator 265 of the circuit 26 is low (when the battery is not deemed to be over-charged). When the digital comparator 265 provides a high level signal which indicates that the battery is over-charged, the counter 2751 counts the clock pulse every 2 minutes thereafter. The output signals Q0, Q1 and Q3 of the lowest digit (or lowest bit), the middle digit and the highest digit of the counter 2751 are sent respectively to the AND gates 2761, 2762 and 2763.

When a signal indicating the battery-overcharging is sent from the circuit 26, the AND gate 2761 opens to turn on a transistor 277, thereby lowering the reference voltage Vref by 0.2 V. The switching operation of the transistor 277 corresponds to 0.2 V-change of the reference voltage Vref, the switching operation of a transistor 278 corresponds to 0.4 V-change of the same, and the switching operation of a transistor 279 corresponds to 0.8 V-change of the reference voltage Vref. Thus, the change of the 3-bit signal of the counter 2751 changes the reference voltage Vref gradually through eight steps.

When the digital comparator 265 of the circuit 26 provides a low level signal indicating no-battery-overcharging, the inverter 2752 resets the counter 2751 to close the AND gates 2761–2763, thereby restoring the reference voltage to the original voltage shortly.

A reference numeral 282 is a reference-voltage generating circuit which is composed of the transistors 277–280, a zener diode 281 and resistors and provides 8 different level voltages.

The reference-voltage generating circuit 29 is described before.

Figure 11:
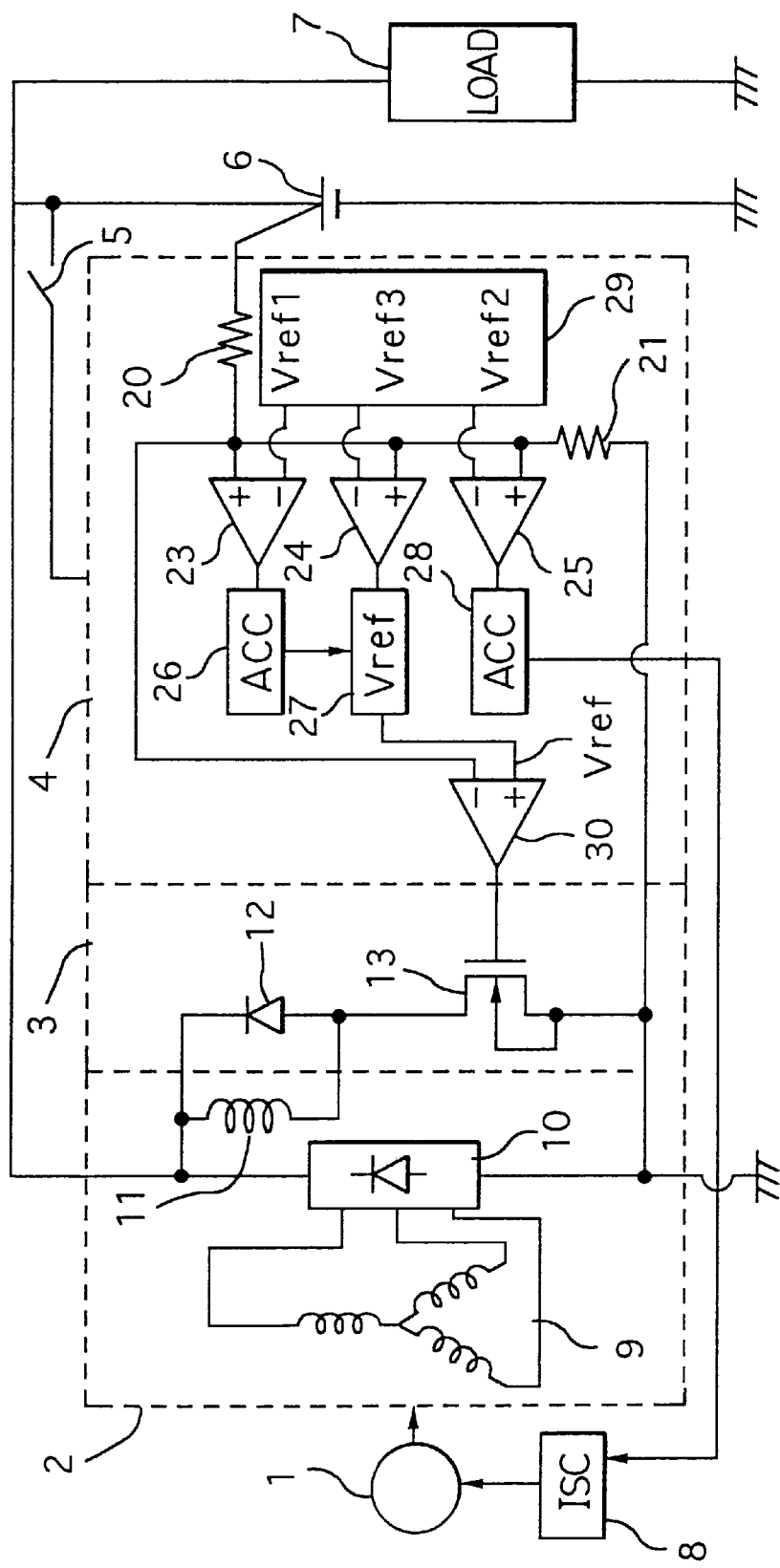
FIG. 11 is a block diagram of a vehicle battery charging system having a voltage regulator of an alternator according to a fourth embodiment of the present invention.
Figure 15:
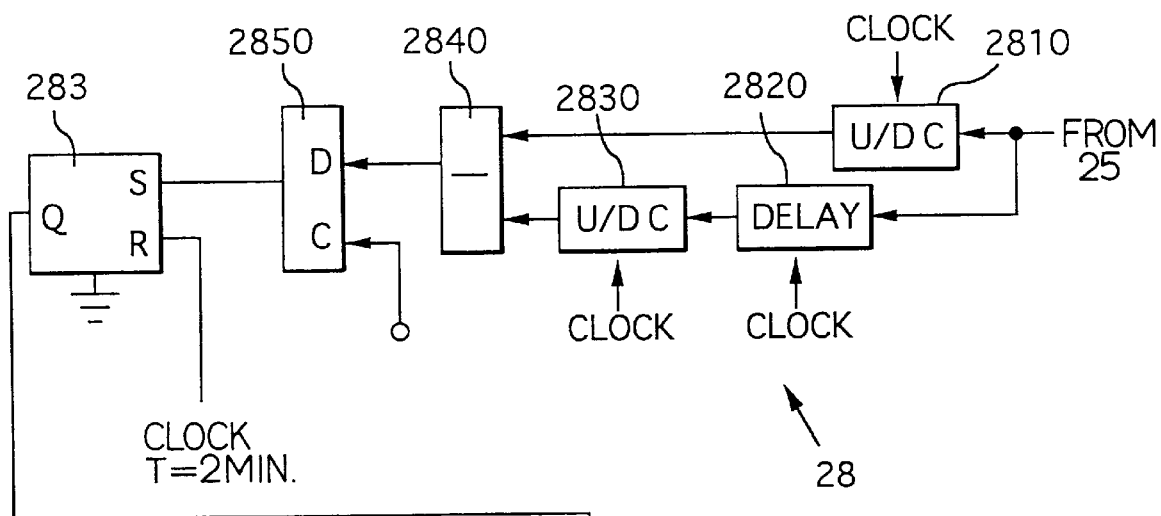
FIG. 15 is a circuit diagram of a block circuit 28 shown in FIG. 11.

The comparator 25 and the charge-shortage-time accumulation circuit 28 are described with reference to FIGS. 11 and 15.

The comparator 25 compares the battery voltage Vb with the reference voltage Vref2 indicating shortage of battery charge (e.g. 13.0 V for the battery). If the battery voltage is found to be lower than the reference voltage Vref2, the charge-shortage-time accumulation circuit 28 accumulates the time periods (charging-current shortage period T2). Subsequently, whether or not the charging-current shortage period T2 is longer than the current-shortage reference level Tth2 is checked. If T2>Tth2 is found to indicate shortage of battery-charge which is detrimental to the battery, the engine idle speed is increased to a higher level (e.g. by 50 rpm) by the idle speed control unit 8. On the other hand, if T2<Tth2 indicating that shortage of battery-charge is dissolved, the idle speed is restored to the original speed.

Operation of the charge-shortage-time accumulation circuit 28 is further described with reference to FIG. 15.

If the division (hereinafter referred to as the battery voltage) of the battery voltage becomes lower than the reference voltage Vref2, the comparator 25 sends a high level signal to an UP/DOWN counter 2810, which counts up every 0.1 second as far as the battery voltage is lower than the reference voltage Vref 2 and counts down if it is higher. The output signal of the comparator 25 is delayed 26 minutes by a digital delay circuit 2820 and sent to the UP/DOWN counter 2830, which counts up every 0.1 second if the delayed battery voltage is lower than the reference level voltage Vref2 and counts down if it is higher.

A reference numeral 2840 is a subtracter which subtracts the output signal of the UP/DOWN counter 2830 from the output signal of the UP/DOWN counter 2810 and send the result to a digital comparator 2850. The result is given by subtracting the output signals of the comparator 25 accumulated after it is powered until 26 minutes from the present from the output signal of the comparator 25 accumulated after it is powered until the present. That is, the output signals of the comparator 25 accumulated in the last 26-minute period.

The digital comparator 2850 compares the above subtraction result with a preset digital value (0 for this embodiment). If the result is larger than the preset digital value, it is deemed that the total period in which the battery voltage Vb is lower than the reference voltage Vref2 amounts to 50% or more of the last 26-minutes period and that the battery is short of charging current. And the RS flip-flop circuit 283 is set to turn on a transistor 284 of a buffer inverter. The RS flip-flop circuit 283 receives a clock pulse at the reset terminal every 2 minutes to renew the data.

The signal to turn on the transistor 284 which forms a buffer inverter with a resistor 285 is sent to an engine control unit (not shown), which increases the idle speed by, for example, 50 rpm. On the other hand, the turn-off signal of the transistor 284 lowers the idle speed by a fixed amount.

(Fifth Embodiment)

Figure 16:
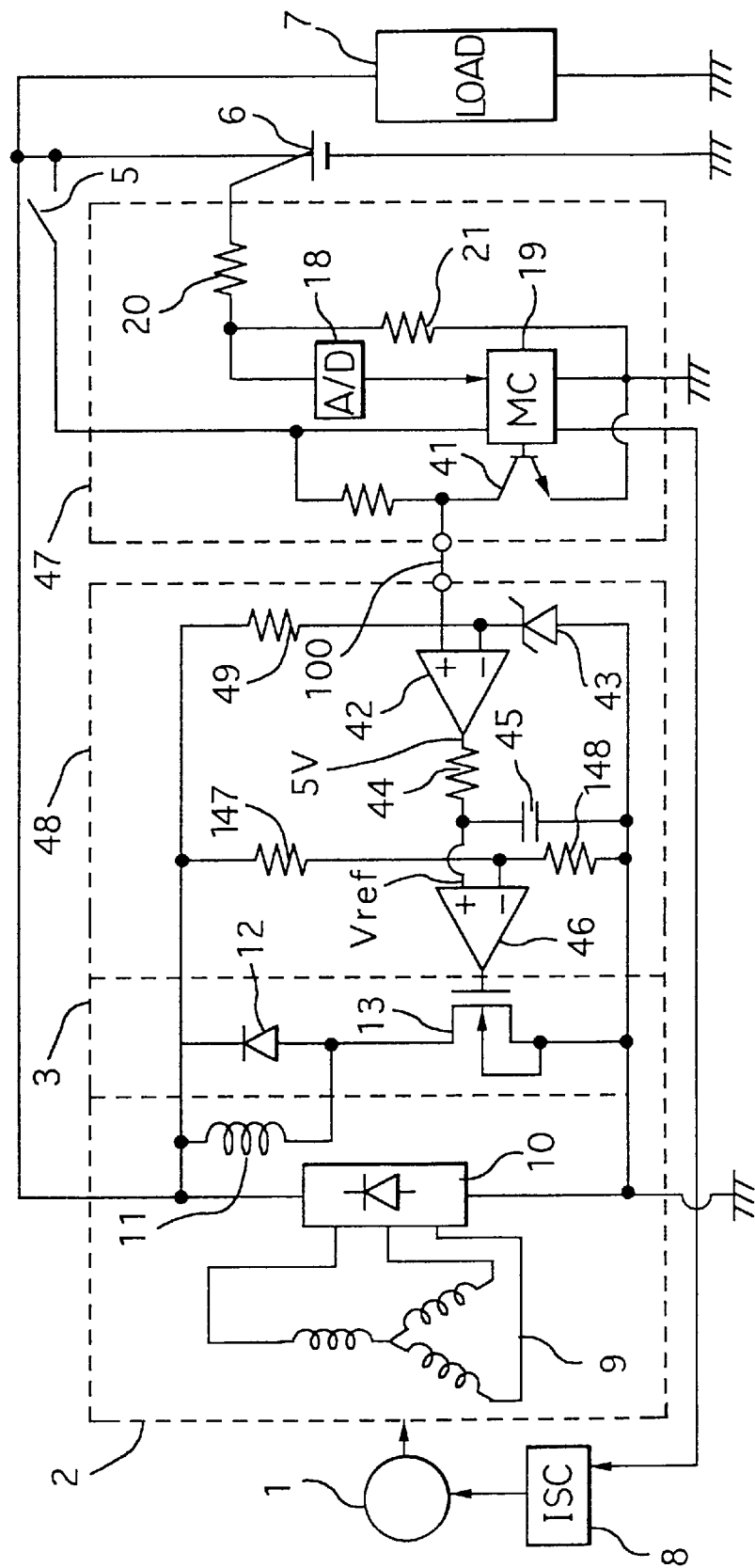
FIG. 16 is a block diagram of a vehicle battery charging system having a voltage regulator of an alternator according to a fifth embodiment of the present invention.

FIG. 16 shows a fifth embodiment, in which the same part or element has the same reference numeral as the above embodiments.

The charge control circuit 4 of the first embodiment (shown in FIG. 1) is divided into an outside charge control circuit 47 and a inside charge control circuit 48 in this embodiment, and they are connected by a signal wire 100 each other.

The outside charge control circuit 47 disposed outside the alternator has the same dividing resistors 20 and 21, A–D converter 18 and microcomputer 19 as the charge control circuit 4 of the first embodiment. The output signal of the microcomputer 19 is sent to a comparator 42 of the inside charge control circuit 48 through a transistor 41.

The inside charge control circuit 48 disposed in the alternator is composed of a comparator 42 which receives the reference voltage signal through the signal wire 100, a integrating circuit having a resistor 44 and a capacitor 45, a comparator 46 which controls the field-current driving transistor 13, a voltage dividing circuit having resistors 147 and 148 and a constant voltage circuit having a resistor 49 and a zener diode 43.

The circuit of this embodiment has the outside charge control unit 47 and the A/D converter in addition to the circuit of the first embodiment, and the description of operation is focussed on this feature. FIG. 2 can be referred to the operation thereof.

The microcomputer 19 of the outside control circuit 47 calculates an average of the battery voltages, determines necessity of changing the reference voltage Vref and calculates the amount of the reference voltage to be changed. The microcomputer 19 also calculates the duty ratio corresponding to the reference voltage. For example, when the reference voltage is 15 V, the duty ratio is set to be 90%, and when the reference voltage is 12 V, it is set to be 10%. Other duty ratios are calculated by linear interpolation. A signal of a calculated duty ratio (duty ratio signal) is sent to the inside charge control circuit 48 disposed in the alternator 1. The comparator 42 of the inside charge control circuit 48 compares the duty ratio signal with a reference level voltage provided by the constant voltage circuit and provides a shaped signal, which is smoothed by the integrating circuit composed of the resistor 44 and capacitor 45 to provide an analog reference level voltage indicating the duty ratio. The comparator 46 compares the reference voltage Vref with the alternator output voltage and on-off controls the field current to regulate the alternator output voltage.

The signal communicating the outside charge control circuit 47 and the inside charge control circuit 48 can be any other signal indicating the reference level such as a frequency signal or an analog signal besides the duty ratio signal (PWM signal). That is, the inside charge control circuit 48 compares the reference voltage Vref with the division of the alternator output voltage and provides a driving signal sent to the field current driving circuit. The outside charge control circuit 47 determines the average battery charging condition and provides the reference voltage Vref and sends a signal of the reference voltage to the inside charge control circuit 48. In other words, the outside circuit which checks the battery voltage omits the voltage sensing terminals in the alternator. The field driving transistor 13 is turned on and off not by a direct sensor signal but by the reference voltage Vref, so that disconnection of the terminals can be detected as a fail-safe control. For example, in FIG. 16, if the duty ratio of the signal provided by the transistor 41 is 0% or 100%, it is deemed that the disconnection or a trouble takes place. The outside charge control circuit 47 can accommodate other controllers (e.g. engine control unit) therein.

(Other embodiments)

The setting time set in the step 102 shown in FIGS. 2, 4 and 6 is set to be longer than a minimum operating time of a motor-driven radiator fan for cooling engine coolant. As a result, the reference voltage may not be affected by change in the battery voltage caused by the on-off operation of the radiator fan.

The decreased amount of the reference voltage set in the step 138 shown in FIGS. 2, 4 and 6 when the battery overcharging is detected is set so that a ratio of the set voltage change decided by the decreased amount and the routine cycle time of the step 102 is between 0.01–0.1 V. As a result, the over-charging due to slow change in the output voltage and also unpleasant feeling due to rapid change in the output voltage can be prevented.

When charge-shortage of the battery or over-discharging of the battery is detected according to the average charge voltage, the set voltage has to be changed faster than when the normal voltage regulation is carried out.

The reference level for detecting the average charging voltage changes with change in the battery temperature and parameters related thereto. For example, the reference voltage generating circuit 29 is disposed in the vehicle alternator to provide the reference level voltages Vref1, Vref2 and Vref3. In FIG. 14, the output voltage of the voltage dividing circuit composed of the resistors R11 and R12 is applied to the transistor 311. The transistor 311 is unsaturated or turned off when it is low in temperature, and current flowing through a resistor R13 is little or zero so that the reference level voltages Vref1–Vref3 provided by resistors R15–R19 are maintained unchanged. If the temperature of the transistor 311 becomes high, the transistor is fully turned on to lower the reference level voltages Vref1–Vref3. Resistors R13, R14 are a collector resistance and emitter resistance to adjust the collector current respectively. In the circuit 29 shown in FIG. 14, when temperature of the alternator 1 rises, the reference level voltage Vref2, Vref3 are lowered. Because the temperature of the alternator 1 has a positive correlation with the battery disposed in the engine compartment, the reference level voltages Vref1 and Vref3 are lowered when the battery temperature rises.

As a result, if the battery temperature rises and overcharging level lowers, the reference level for the battery over-charging can be lowered so that an optimum generation control with reduction of fuel can be achieved without over-charging of the battery. The circuit shown in FIG. 14 detects the battery temperature by detecting the regulator temperature for simplicity.

Figure 17:
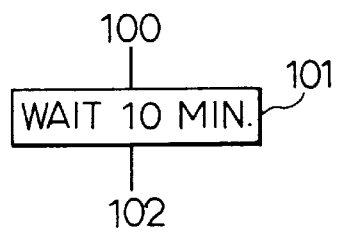
FIG. 17 is a flow chart which is a variation of the flow charts shown in FIGS. 2, 4 and 6.

A preferred embodiment is described with reference to a flow chart shown in FIG. 17, which shows a step 101 to be added to the flow charts shown in FIGS. 2, 4 and 6.

The reference voltage is not changed in the first 10 minutes after the engine (not shown) starts (Step 101), thus preventing shortage of battery charge in the engine starting period.

Figure 18:
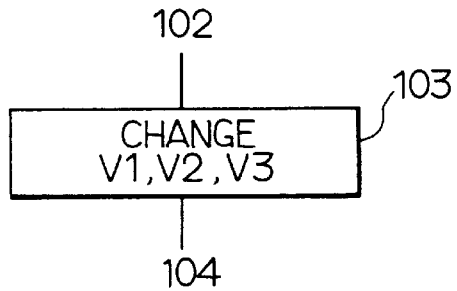
FIG. 18 is a flow chart which is a variation of the flow charts shown in FIGS. 2, 4 and 6.

A preferred embodiment is described with reference to a flow chart shown in FIG. 18 next, which shows a step 103 added to the circuit shown in FIGS. 2, 4 and 6. When the engine (not shown) starts, the time period is counted and the reference levels V1, V2 and V3 are changed according to the time period.

As the time passes after the engine starts, the battery temperature rises and the over-charging level lowers with decrease of the reference levels V1, V2 and V3. Thus, the reference voltage can be lowered without fear of over-charging or over—discharging of the battery in a simple structure to lower the generation level, resulting in reduction of fuel consumption.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A voltage regulating system for a vehicle including an alternator connected to a battery and having a field coil, the system comprising:

a voltage regulator unit for controlling current supplied to said field coil according to a comparison between an output voltage of said alternator and a reference voltage;

first means for continuously accumulating a plurality of values relative to terminal voltage of said battery sampled in a fixed detecting period which is longer than a period of typical speed changes of said engine due to vehicle operation; and second means for changing said reference voltage according to an accumulated amount of said plurality of values.

2. The voltage regulating system as claimed in claim 1, wherein said voltage regulating system is used with a motor-driven radiator fan which is mounted on said engine, and said detecting period is longer than a minimum operation period of said motor-driven radiator fan.

3. The voltage regulating system as claimed in claim 1, wherein said detecting period is between 3 and 30 minutes.

4. The voltage regulating system as claimed in claim 1, where in said second means lowers said reference voltage when said accumulated amount is higher than a first level which indicates over-charge of said battery and raises said reference voltage when said accumulated amount is lower than a second level which indicates shortage of charge of said battery.

5. The voltage regulating system as claimed in claim 1, wherein said second means changes said reference voltage at a controlled rate.

6. The voltage regulating system as claimed in claim 5, wherein said second means raises said reference voltage at a first rate when said accumulated amount becomes a third level which indicates over-discharge of said battery, lowers said reference voltage at a second rate lower than said first rate when said accumulated amount becomes higher than said first level and raises said reference voltage at a third rate which is lower than said first rate when said accumulated amount becomes lower than said second level.

7. The voltage regulating system as claimed in claim 5, wherein said second means changes said reference voltage at a rate which is larger than 0.01 V/minute.

8. The voltage regulating system as claimed in claim 5, wherein said second means changes said reference voltage at a rate less than 0.1 V/minute.

9. The voltage regulating system as claimed in claim 1 further comprising:

an idle speed controlling unit for increasing engine idle speed when said accumulated amount is still lower than said second level after raising said reference voltage.

10. The voltage regulating system as claimed in claim 4 further comprising:

an idle speed controlling unit for decreasing engine idle speed prior to lowering said reference voltage when said accumulated amount is higher than said first level.

11. The voltage regulating system as claimed in claim 1, wherein said second means is stopped to lower said reference voltage if said accumulated amount still remains lower than said second level for longer than a fixed period.

12. The voltage regulating system as claimed in claim 1, wherein
said voltage regulator unit, said first means and second means are disposed in said alternator.

13. The voltage regulating system as claimed in claim 1, wherein
said voltage regulator unit is disposed in said alternator, said first means and said second means are disposed outside said alternator.

14. The voltage regulating system as claimed in claim 1, wherein
said second means is stopped to change said reference voltage for a fixed period after said engine starts.

15. The voltage regulating system as claimed in claim 4, wherein
said second means changes said reference voltage according to battery temperature.

16. The voltage regulating system as claimed in claim 15, wherein
said second means changes said reference level according to temperature of said regulator unit.

17. The voltage regulating system as claimed in claim 15, wherein
said second means changes said reference level according to a lapse of time after engine starting.

18. The voltage regulating system as claimed in claim 1, wherein
said accumulated amount is composed of a voltage signal which is given by subtracting high frequency components from said battery voltage.

19. The voltage regulating system as claimed in claim 18, wherein
said accumulated amount is composed of an average of battery voltages sampled during said detecting period.

20. The voltage regulating system as claimed in claim 1, wherein
said accumulated amount is accumulated periods in which said battery voltage exceeds a specific level during said detecting period.

21. The voltage regulating system as claimed in claim 1, wherein
said accumulated amount is an accumulated value of over-charging current flowing into said battery during said detecting period.

22. A voltage regulating system for a vehicle including an alternator connected to a battery and having a field coil, the system comprising:
a voltage regulator unit for controlling current supplied to said field coil in one of a plurality of battery charging modes;
first means for continuously accumulating a plurality of values relative to a charge-condition of said battery in a fixed detecting period;
second means for comparing an accumulated amount of said plurality of values with a threshold value for each said fixed detecting period; and
third means for setting one of said battery charging modes according to the comparison of said second means.

* * * * *